(12) United States Patent
Sweatt et al.

(10) Patent No.: US 6,859,120 B2
(45) Date of Patent: Feb. 22, 2005

(54) OPTICAL SWITCH USING RISLEY PRISMS

(75) Inventors: William C. Sweatt, Albuquerque, NM (US); Todd R. Christenson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 10/356,157

(22) Filed: Jan. 31, 2003

(65) Prior Publication Data

US 2003/0138193 A1 Jul. 24, 2003

Related U.S. Application Data

(62) Division of application No. 09/875,244, filed on Jun. 5, 2001, now Pat. No. 6,549,700.

(51) Int. Cl.$^7$ .............................................. H01H 51/22
(52) U.S. Cl. ......................... 335/78; 335/270; 310/32; 310/40 MM
(58) Field of Search ..................... 310/40 MM, 168 M, 310/49 R, 164, 32; 335/220–230

(56) References Cited

U.S. PATENT DOCUMENTS

| 3,751,696 | A | * | 8/1973 | Morreale ................... 310/49 R |
| 4,488,069 | A | * | 12/1984 | Field, II ..................... 310/49 A |
| 5,038,064 | A | * | 8/1991 | Fiorenza ..................... 310/116 |
| 5,111,095 | A | * | 5/1992 | Hendershot ................. 310/168 |
| 5,539,267 | A | * | 7/1996 | Fan et al. ................... 310/309 |
| 5,646,464 | A | * | 7/1997 | Sickafus ............... 310/40 MM |
| 5,668,430 | A | * | 9/1997 | Kolomeitsev ............... 310/266 |
| 5,710,466 | A | * | 1/1998 | Allen et al. ........... 310/40 MM |
| 5,783,879 | A | * | 7/1998 | Furlani et al. ........ 310/40 MM |
| 5,874,798 | A | * | 2/1999 | Wiegele et al. ............. 310/168 |
| 6,332,568 | B1 | | 12/2001 | Christenson |
| 6,375,759 | B1 | | 4/2002 | Christenson et al. |
| 6,441,517 | B1 | * | 8/2002 | Brum et al. ................... 310/37 |
| 2001/0046345 | A1 | | 11/2001 | Snyder et al. |

OTHER PUBLICATIONS

Sweatt et al., "Microoptical System and Fabrication Method Therefor," U.S. Appl. No. 09/742,778, filed Dec. 20, 2000.
Holtkamp and Stakelon, "Risley prism pair switching enables parallel testing," WDM Solutions—Current Articles, Mar. 2002.
Wallrabe et al., "Design Rules and Test of Electrostatic Micromotors Made by the LIGA Process," *J. Micromech. Microeng. 4*, 40 (1994).

* cited by examiner

Primary Examiner—Lincoln Donovan
Assistant Examiner—Bernard Rojas
(74) Attorney, Agent, or Firm—Kevin W. Bieg

(57) ABSTRACT

An optical switch using Risley prisms and rotary microactuators to independently rotate the wedge prisms of each Risley prism pair is disclosed. The optical switch comprises an array of input Risley prism pairs that selectively redirect light beams from a plurality of input ports to an array of output Risley prism pairs that similarly direct the light beams to a plurality of output ports. Each wedge prism of each Risley prism pair can be independently rotated by a variable-reluctance stepping rotary microactuator that is fabricated by a multi-layer LIGA process. Each wedge prism can be formed integral to the annular rotor of the rotary microactuator by a DXRL process.

9 Claims, 14 Drawing Sheets

OPTICAL SWITCH USING RISLEY PRISMS

CROSS REFERENCE TO RELATED APPLICATIONS

This is a divisional of application No. 09/875,244, filed Jun. 5, 2001 now U.S. Pat. No. 6,549,700. +gi

STATEMENT OF GOVERNMENT INTEREST

This invention was made with Government support under contract no. DE-AC04-94AL85000 awarded by the U.S. Department of Energy to Sandia Corporation. The Government has certain rights in the invention.

BACKGROUND OF THE INVENTION

The optical switch of the present invention comprises Risley prisms (i.e., pairs of wedge prisms) to redirect light beams from an array of input ports to an array of output ports. The invention further comprises a stepping rotary microactuator for independent rotation of each wedge prism of a Risley prism pair to redirect the light beams.

As the demand for network capacity grows, telecommunications are being increasingly constrained by the need for more bandwidth. Optical fiber is a transmission medium capable of meeting this demand, having the potential in combination with dense wavelength division multiplexing (DWDM) to provide carrying capacity in a single fiber of hundreds of trillions of bits (terabits) per second, far greater than other means suggested for long-distance communications.

However, network transmission speeds and equipment costs are currently severely limited by the requirement of slow and complex electronic switching for signal routing—converting an optical (i.e., photonic) signal from an input optical fiber into an electronic signal, switching the lower speed electronic signal, converting the electronic signal back to an optical signal, and redirecting the optical signal through an output optical fiber. In particular, it is unlikely that such optoelectronic switching will be able to accommodate the large increase in network bandwidth that will accompany the full implementation of DWDM. To fully exploit an optical fiber's full bandwidth will likely require integrating the transmission, combination, amplification, and switching of optical signals in an all-optical network without optoelectronic switching. Furthermore, efficient switching of terabit optical signals from an input optical fiber array to an array of output optical fibers may require optical cross-connect switches with 256-input×256-output ports or more.

A number of technologies have been proposed to provide an all-optical switch for telecommunications. These include micromachined tilting mirrors, liquid crystals, bubbles, holograms, and thermo- and acousto-optics. However, none of these technologies are likely to satisfy a wide range of applications, as the requirements for optical fiber array size, scalability, switching speed, reliability, optical loss, cost, and power consumption differ greatly depending on the functionality desired.

In particular, microelectromechanical systems (MEMS) technology has been proposed for optical cross-connects whereby arrays of micromirrors are built on a silicon wafer using surface micromachining fabrication similar to that used in making integrated circuits. These MEMS optical switches use micromirrors to redirect light beams from as many as 256-input to 256-output ports. Each micromirror can be less than 1 millimeter in diameter. However, such a MEMS switch is complex. Furthermore, switching times can be slow and the long-term reliability of moveable parts is a concern. Additionally, the spatial resolution of the MEMS switch may need improvement for some applications. In a large cross-connect switch, the mirrors must be capable of a large range of angular motion, yet be able to accurately move an incident light beam through small tilt angles in order to redirect the incident light beam to a particular output optical fiber and achieve low optical throughput loss. Finally, this MEMS switch requires tightly controlled cleanroom fabrication and contaminant-free switch operation.

Particularly for cross-connect applications, there remains a need for a reliable, scalable, low loss, fast, and low cost optical switch.

SUMMARY OF THE INVENTION

According to the present invention, one or more incident light beams from the array of input ports (i.e., input optical fibers) are collimated into an associated array of input Risley prisms (hereinafter termed a Risley prism pair). By independent rotation of the first wedge prism relative to the second wedge prism of each input Risley prism pair, the light beam exiting from any input Risley prism pair can be selectively redirected to any one of an array of output Risley prism pairs. In similar fashion, the wedge prisms of each output Risley prism pair can be independently rotated to direct the light beam into an associated output port (i.e., the output optical fiber) of the optical switch.

Each wedge prism of each input and output Risley prism pair is rotated independently by a rotary microactuator. The rotary microactuator can comprise a cylindrically symmetric electromagnetic stator and an annular soft ferromagnetic rotor that can be patterned with magnetically salient, variable-reluctance pole faces suitable for small angle stepping to provide precise, independent rotation of each wedge prism of a Risley prism pair.

The rotary microactuator can be fabricated by a seven-layer LIGA process (LIGA is a German acronym that stands for lithography, electroplating, and molding), described hereinafter. The seven-layer LIGA process comprises forming sets of stator coil bottoms on a substrate, forming bond pads on the substrate, bonding stator core suspensions to the bond pads, bonding stator coil columns to the stator coil bottoms, bonding stator coil tops to the stator coil columns to form a stator assembly, and bonding a rotor assembly to the substrate within the stator assembly. The rotor assembly is fabricated by forming a torsional spring on a sacrificial substrate and bonding the annular rotor to the torsional spring.

The wedge prisms can be fabricated, integral to the annular rotor of the rotary microactuator, by a deep X-ray lithography (DXRL) process. Using batch-processing techniques, an array of such rotatable wedge prism assemblies can be fabricated on the substrate.

BRIEF DESCRIPTION OF THE DRAWINGS

The accompanying drawings, which are incorporated in and form part of the specification, illustrate the present invention and, together with the description, explain the invention. In the drawings, like elements are referred to by like numbers.

FIG. 2 illustrates the operation of a Risley prism pair, with each Risley prism pair comprising a first and a second wedge prism.

DETAILED DESCRIPTION OF THE INVENTION

The invention comprises an optical switch comprising two or more Risley prism pairs for selectively switching an incident light beam from any input fiber of a plurality of input optical fibers to any output fiber of a plurality of output optical fibers. The optical switch uses independent rotation of each wedge prism of input and output Risley prism pairs to redirect the incident light beam to a selected output fiber. The invention further comprises a rotary microactuator that can be formed integrally with each wedge prism for precise rotation thereof. The rotary microactuator can be fabricated by a seven-layer LIGA process. The integral wedge prism can be fabricated by a DXRL process. The optical switch using Risley prisms and a method for fabricating the optical switch and the rotatable wedge prism assembly are described below.

Optical Design of the Optical Switch

Figure 1:
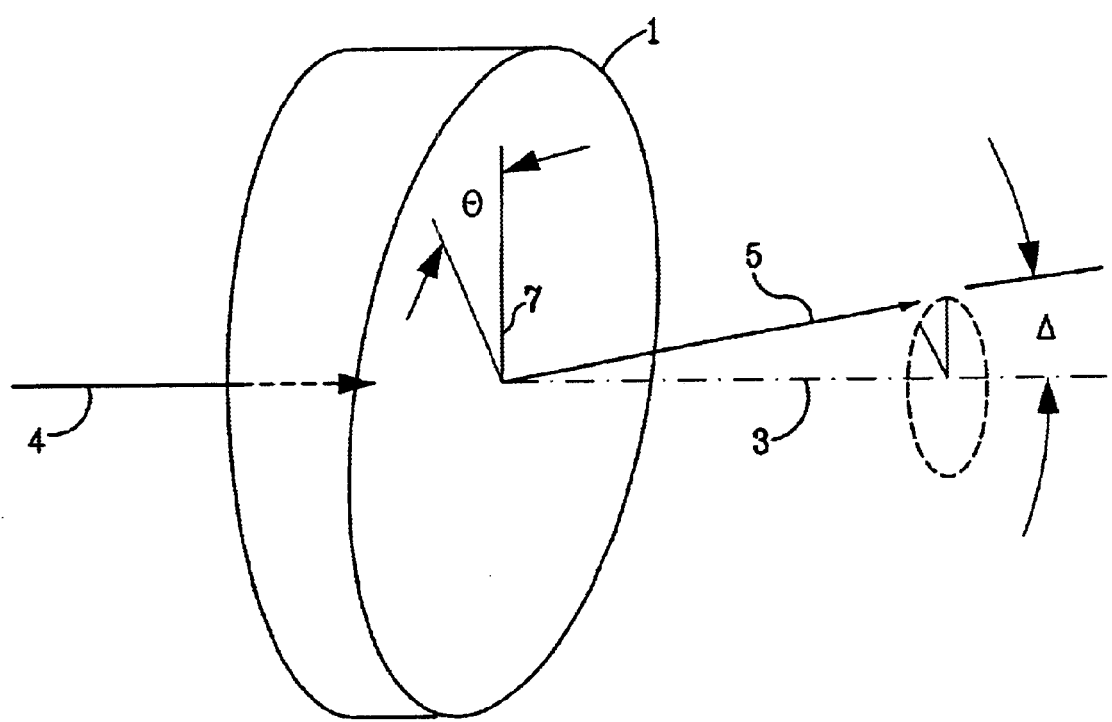
FIG. 1 illustrates the operation of a wedge prism to deflect an incident light beam.

A prism can be used to change the direction of propagation of an incident beam of light. As shown in FIG. 1, a wedge prism 1 having an optical axis 3, can be used when a relatively small deviation of an incident light beam 4 is desired. An exiting light beam 5 will emerge from the wedge prism 1 having been deflected from its incident direction by an angular deviation given by the angle Δ. Using Snell's Law and geometric considerations for small prism apex angles, α, the angular deviation, Δ, is given by $$\Delta = \alpha(n-1)$$

where n is the index of refraction of the prism material relative to the surrounding medium. Furthermore, the exiting beam 5 can be deflected azimuthally by rotating the wedge prism 1 around the optical axis 3 by an azimuthal angle, θ, relative to the optical axis normal 7. This allows the incident light beam 4 to be deflected anywhere upon a conical surface determined by the angles Δ and θ, with Δ further being determined by the prism apex angle between the optical surfaces of the wedge prism 1.

Figure 2A:
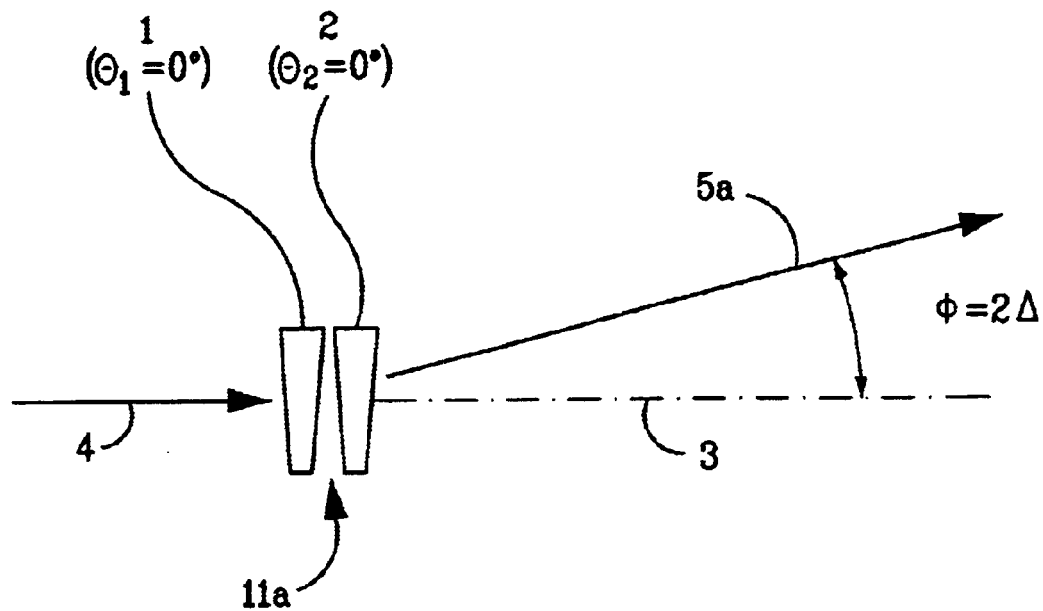
FIG. 2A shows a Risley prism pair oriented to maximize the total angular deviation of an incident light beam.
Figure 2B:
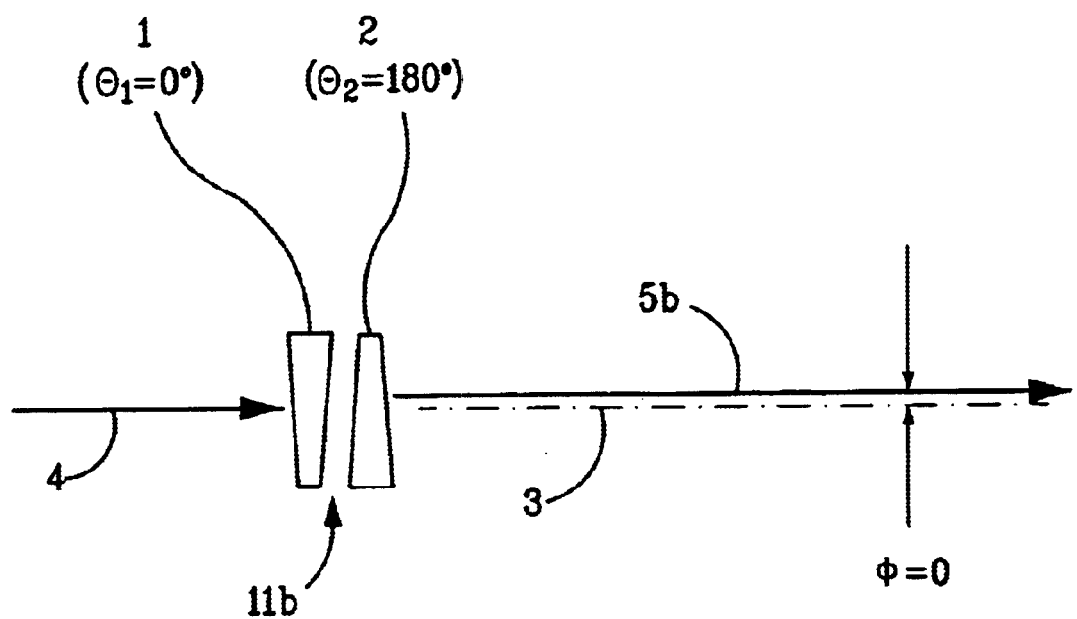
FIG. 2B shows a Risley prism pair oriented to provide a zero angular deviation of the incident light beam.

Risley prisms comprise a pair of generally identical wedge prisms that can be independently rotated to redirect the beam in two dimensions. As shown in FIGS. 2A and 2B, when a Risley prism pair 11a, 11b is placed with the optical axis of the first wedge prism 1 parallel to or in line with the optical axis of the second wedge prism 2, the total angular deviation, Φ, of the Risley prism pair 11a, 11b depends on the relative orientation of the first and second wedge prisms 1, 2 about the common optical axis 3. As shown in FIG. 2A, when the first and second wedge prisms 1, 2 of the Risley prism pair 11a are oriented the same way (i.e., $\theta_1=\theta_2=0°$) the beam deviation of each wedge prism 1 and 2 is additive so that the total angular deviation, Φ, of the exiting beam 5a from the Risley prism pair 11a is a maximum and is equal to the sum of the angular deviations of each wedge prism (i.e., Φ=2Δ). As shown in FIG. 2B, when the first and second wedge prisms 1, 2 are counterrotated at 180° relative to one another (e.g., $\theta_1=0°$ and $\theta_2=180°$) their beam deviating effects cancel and the total angular deviation of the beam 5b exiting from the Risley prism pair 11b is zero (i.e., Φ=0). In general, the total angular deviation Φ of the exiting beam from a Risley prism pair, 11, is $$\Phi = 2\Delta\cos(\theta_1-\theta_2)/2$$

and the total azimuthal angle, Θ, of the Risley prism pair, 11a or 11b, is $$\Theta = (\theta_1+\theta_2)/2$$

Figure 3:
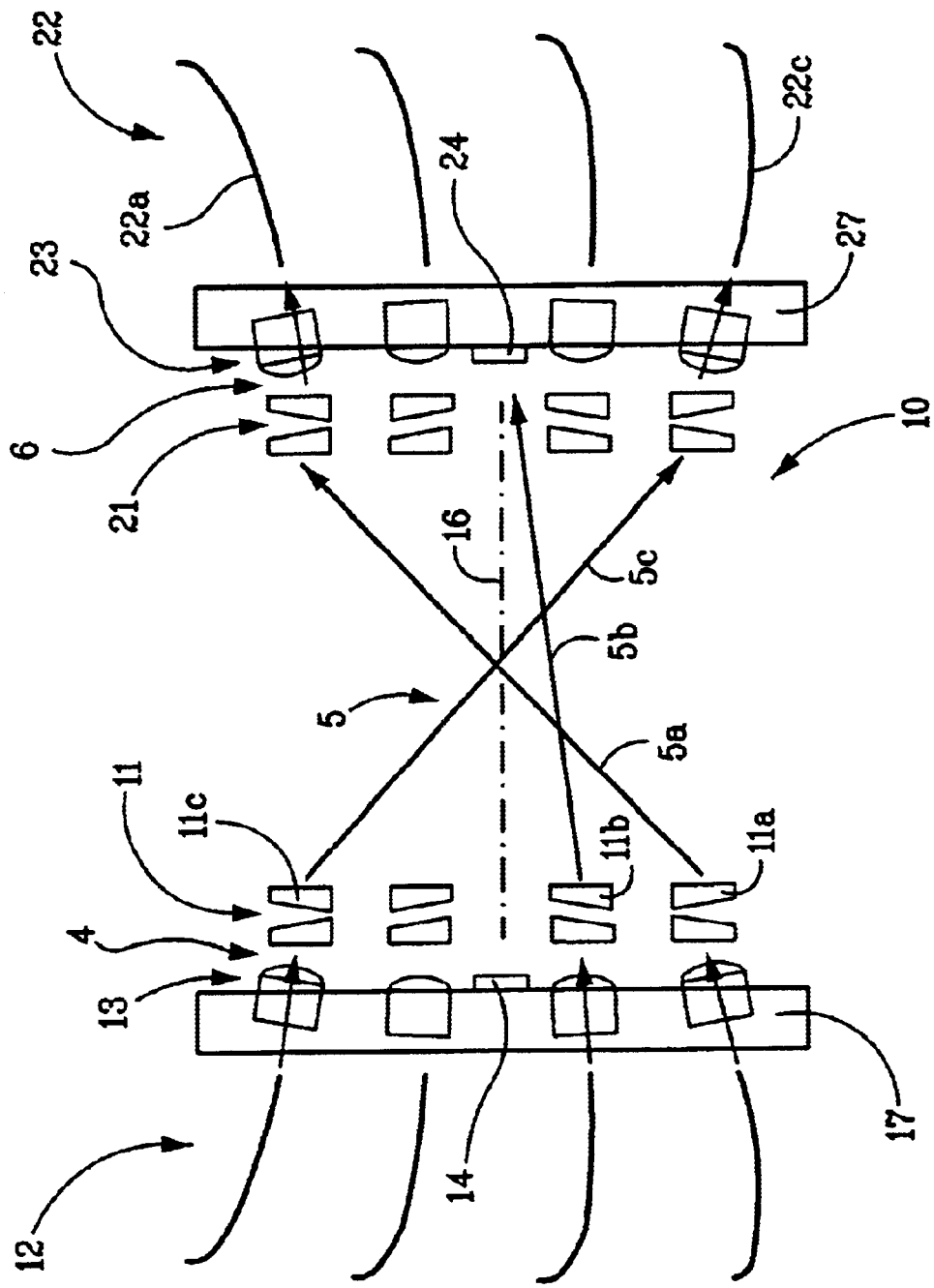
FIG. 3 illustrates a cross-sectional view of an optical switch based on multiple Risley prism pairs.

FIG. 3 shows a schematic cross-sectional view of opposing arrays 11, 21 of Risley prism pairs configured to form an optical switch 10 according to the present invention. The optical switch 10 is designed to selectively switch light beams 5 from one or more input optical fibers 12 to one or more output optical fibers 22 by appropriate orientation of each input and output Risley prism pair arrays, 11 and 21, respectively. An array of input collimating lenses 13 can be used to collimate the incident light beam 4 from each input optical fiber 12 into an input Risley prism pair 11. Conversely, optical output lenses 23 focus the switched light beams 6 from each output Risley prism pair 21 into an output fiber 22.

To center the cone of deflection of each Risley prism pair in the input array 11 about the output array 21, the input collimating lenses 13 can be configured so that the source beams 5 are pre-aligned to a center detector 24 when the first and second wedge prisms 1,2 of a Risley prism pair are counterrotated by 180° (e.g., $\theta_1=0°$ and $\theta_2=180°$). This is shown in FIG. 3 for the light beam 5b from the counterrotated Risley prism pair 11b. The same pre-alignment can be done for the output focussing lenses 23 with respect to an opposing center detector 14 by providing backward-directed light beams through each of the output fibers 22. The pre-alignment can be provided by a lens mounts 15, 25 wherein the lenses 13, 23 are held and arrayed as shown in FIG. 3. The lens mounts 15, 25 can also be used to align the fibers 12, 22 to the lenses 13, 23.

A Risley prism pair 11 on the input side of the optical switch 10 can be oriented so that a light beam 5 passing therethrough is redirected to any selected optical fiber 22 of the switch 10. When the first and second wedge prisms 1, 2 are oriented with the optical axis normal 7 (i.e., $\theta_1=\theta_2=0°$), as shown by Risley prism pair 11a in FIG. 3, the beam 5a is deflected upward in the plane of FIG. 3 by the maximum angular deviation, $\Phi=+2\Delta$, to address the uppermost optical fiber 22a. If the wedge prisms 1, 2 are now counterrotated equally in opposite directions, movement about a line is generated with the light beam 5 being deflected up or down in the plane of FIG. 3 about a centerline 13. Conversely, when both wedge prisms are rotated 180° ($\theta_1=\theta_2=+/-180°$), the Risley prism pair 11c will deflect the beam 5c downward with the maximum angular deviation, $\Phi=-2\Delta$, to address the lowermost optical fiber 22c. The Risley prism pair in the output array 21 processing a particular redirected beam 5 is oriented oppositely to the corresponding Risley prism pair in the input array 11 that produced that particular redirected beam 5, so as to direct the switched beam 6 into the output optical fiber 22 associated with the output Risley prism pair through which the deflected beam 5 passes.

The wedge prisms of an input Risley prism pair can also be counterrotated to change the total azimuthal angle of the beam (i.e., with $\Theta$ not equal to zero, to bring the beam out of the plane of FIG. 3). If rotated about its optical axis 3, a single wedge prism 1 will rotate the deflected beam 5 in a cone (see FIG. 1). A second, identical wedge prism 2 of a Risley prism pair can double the angle of the beam rotation and generate a cone twice as large (see FIG. 2A).

Figure 4:
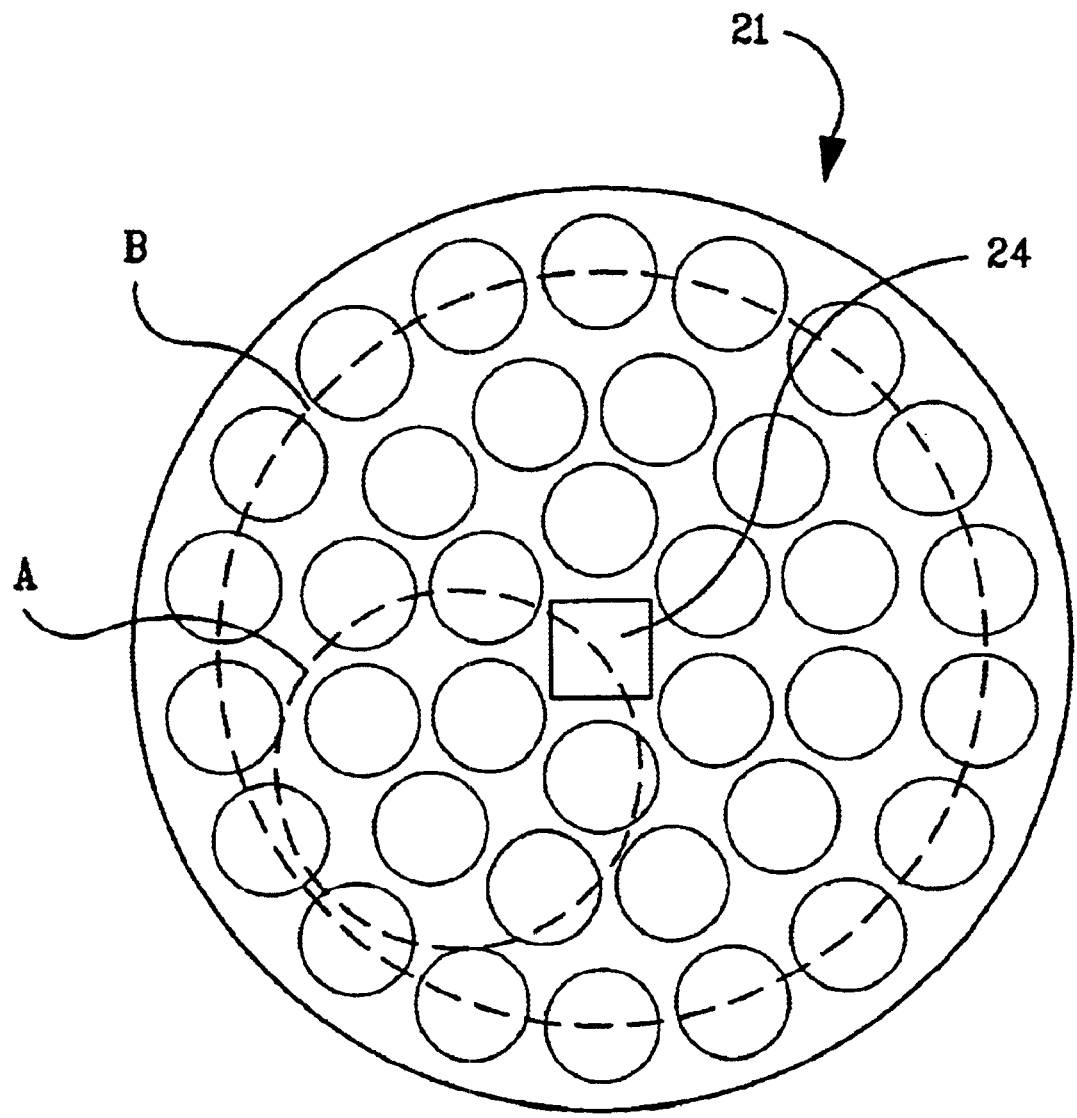
FIG. 4 illustrates an end-on view of a circular array of output Risley prism pairs. Any output Risley prism pair can be optically accessed by suitable relative orientation of the first and second wedge prisms of an input Risley prism pair.

FIG. 4 shows an end-on view of an optical switch 10 comprising an output array 21 having 36 output Risley prism pairs configured in a circular array according to one embodiment of the present invention. As shown in FIG. 4, if the first and second wedge prisms 1, 2 of an input Risley prism pair of the input array 11 are initially oriented so that the deflected beam 5 is initially directed to a centerline detector 24 (e.g., $\theta_1=-135$ and $\theta_2=45°$), a small dashed-line circle A can be addressed by rotation of the second wedge prism 2 through 360° while the first wedge prism 1 of the input Risley prism pair is held fixed. When the second wedge prism 2 is aligned in the same orientation as with the first wedge prism 1 (e.g., $\theta_1=\theta_2=-135°$) a large dashed-line circle B can be addressed that is twice the diameter as the small circle A. By changing the relative orientations of the first and second wedge prisms 1, 2 of the input Risley prism pair, the deflected beam 5 can be directed to access any one of the output Risley prism pairs of the circular output array 21. Other, non-circular, configurations of the Risley prism pair arrays 11, 21 are possible.

For Risley prisms of a particular aperture size, the size of the optical switch 10 and the distance between the input and output arrays 11, 21 can be estimated from simple optics. For example, for Risley prism pairs having a clear aperture of 1.5 millimeter diameter, the input/output array separation can be on the order of 10 inches. For a 256-input ×256-output port circular array optical switch 10 with a separation between the axes of adjacent Risley prism pairs of about 2.5 mm, to provide space for the rotary microactuators, the overall radius of each array, 11 and 21, can be about one inch. The maximum total angular deviation required of each Risley prism pair for such arrays 11, 21 is thus 0.09 radians. With each wedge prism of the Risley prism pair having an index of refraction, n=1.5, the required prism apex angle is about 5°.

Fabrication of the Rotary Microactuator for Rotating Each Wedge Prism of a Risley Prism Pair An example of a rotary microactuator useful for rotating each wedge prism of a Risley prism pair is now described with reference to FIGS. 5–14. In particular, three-dimensional (3D) microstructures possible with LIGA fabrication enable electromagnetic rotary microactuators capable of generating significant driving torque with low driving impedance.

Figure 5:
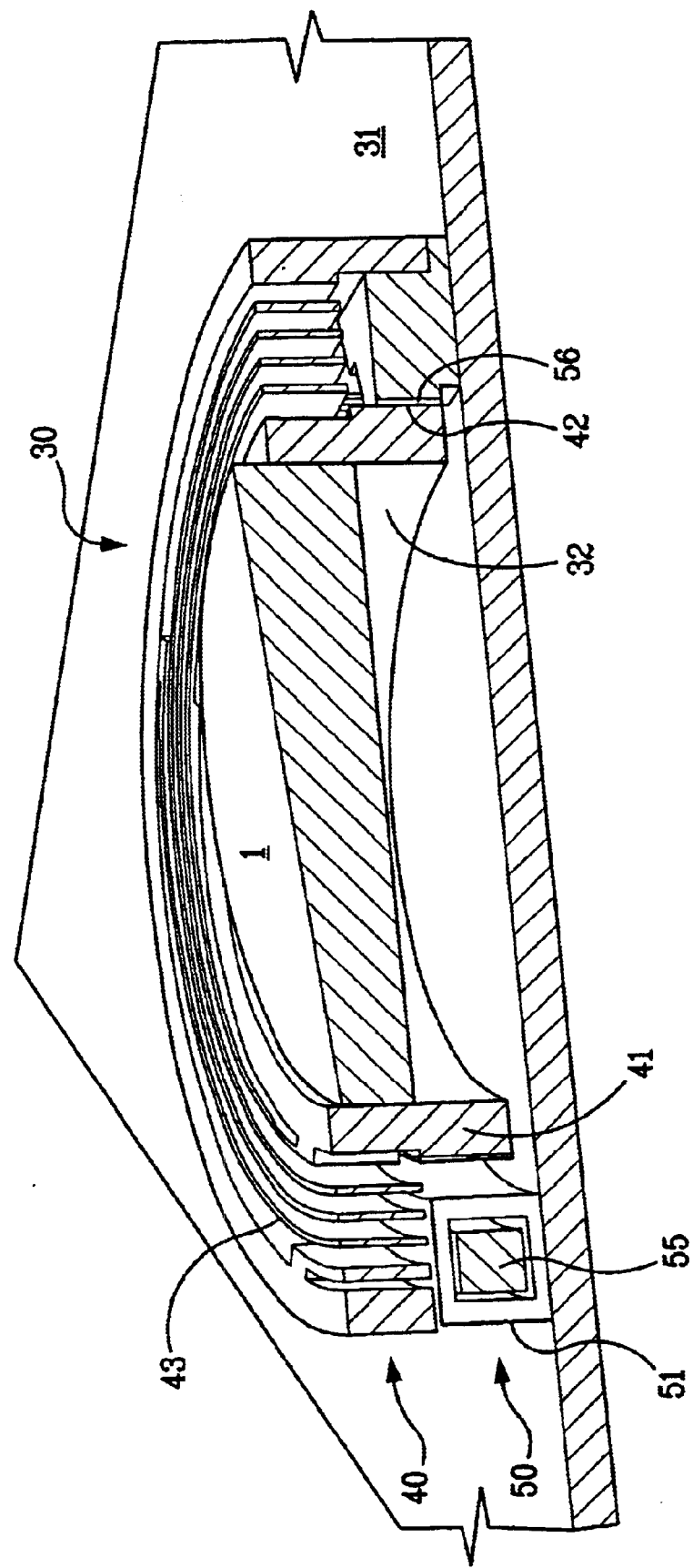
FIG. 5 shows a cross-sectional perspective view of a rotatable wedge prism assembly, comprising a rotary microactuator with an integral wedge prism.

FIG. 5 shows a schematic cross-sectional perspective view of a rotatable wedge prism assembly for rotating a wedge prism 1 of a Risley prism pair that can be used in the optical switch 10 of the present invention. The rotatable wedge prism assembly comprises a rotary microactuator 30 and an integral wedge prism 1. The rotary microactuator 30, can be fabricated by a LIGA process. The integral wedge prism 1 can be fabricated by a DXRL process. The rotary microactuator 30 comprises a rotor assembly 40 and a segmented stator assembly 50. The stator assembly 50 further comprises a plurality of electrically conducting stator coils 51 surrounding soft ferromagnetic stator cores 55 that enhance the magnetic field generated by the stator coils 51 in response to the electrical current flowing in the stator coils 51. A soft ferromagnetic annular rotor 41 is rotatable in response to the magnetic field produced by the electrical currents provided to the stator coils 51. The rotor 41 and stator cores 55 have magnetically salient, variable-reluctance pole faces 42, 56, respectively, that define a working gap and enable small angle stepping of the rotor 41 for precise rotation and control of the integral wedge prism 1. The opposing pole faces 42, 56 can comprise a plurality of axially aligned teeth to provide the magnetic saliency. This magnetic saliency presents a variable reluctance to the magnetic circuit created when the stator coils are electrically excited that depends on the positioning of the rotor and stator teeth. Stepping of the rotor 41 is thereby driven by a tangential force generated by the phased magnetic field between the pole faces 42, 56, with the magnetic field tending to align the rotor with the stator teeth therein to minimize magnetic circuit reluctance.

A variety of means, such as gears, bearings, springs, or other guides can be used to rotatably support the rotor 41 within the stator assembly 50. However, because the optical switch 10 can require switching frequencies of tens of kHz or more, minimization of sliding and rolling contacts is preferred for reliable, repetitive operation. A restoring rotor torsional spring 43, as shown in FIG. 5, can enable rotation of the rotor 41 without sliding or rolling contact, while inhibiting radial and axial misalignment of the rotor 41 within the stator assembly 50. Wobble of the rotor 41 is further inhibited by the axial variable reluctance of the annular rotor 41 within the stator pole faces 56.

The rotary microactuator 30 shown schematically in FIG. 5 can be fabricated by a LIGA process as described hereinafter. LIGA is particularly well suited for the present invention because of its ability to produce precision, large aspect ratio microstructures. LIGA combines DXRL with thick film deposition, typically by electroplating, to produce prismatic geometries with several hundred microns feature heights and with a lateral run-out of generally less than 0.1 micron per 100 micron feature thickness. Microstructures comprising polymers, glasses, metals, ceramics, and composites can be fabricated by LIGA. Furthermore, modern batch processing enables the parallel fabrication of multiple, complex LIGA microstructures on a common substrate.

With batch LIGA processing, arrays of rotary microactuators 30 can be fabricated to independently rotate the wedge prisms 1, 2 of each Risley prism pair in the input and output arrays 11, 21 of the optical switch 10. A seven-layer LIGA process is described below for fabricating a six-pole, three-phase variable-reluctance stepping rotary microactuator 30. With LIGA, the rotary micro-actuator 30 can have a working gap of 5 microns, a diameter at the working gap 58 of 1.75 millimeters, and a pole face 42, 56 height of 250 microns. As indicated above, rotary microactuators of other dimensions are readily obtained with LIGA. A wedge prism 1 can also be integrally fabricated by a DXRL process. Although fabrication of a single rotary microactuator 30 with an integral wedge prism 1 will be described, those skilled in the art will understand that an array of rotatable wedge prism assemblies, as shown in FIG. 5, can be similarly formed on a common substrate by modern batch processing.

The first layer of the seven-layer rotary microactuator fabrication process comprises forming the bottoms 52 of a plurality of square cross-section helical stator coil windings 51 on an electrically insulating substrate 31. The coil winding bottoms 52 can be formed by conventional LIGA processes, whereby a substrate is coated with a thick photoresist, the photoresist is selectively exposed to collimated radiation through a patterning mask, the exposed polymer is removed by a suitable developer to produce a mold, a complimentary microstructure is formed by electroplating of the structural material in the void spaces of the mold, and the mold is removed by stripping.

Figure 6:
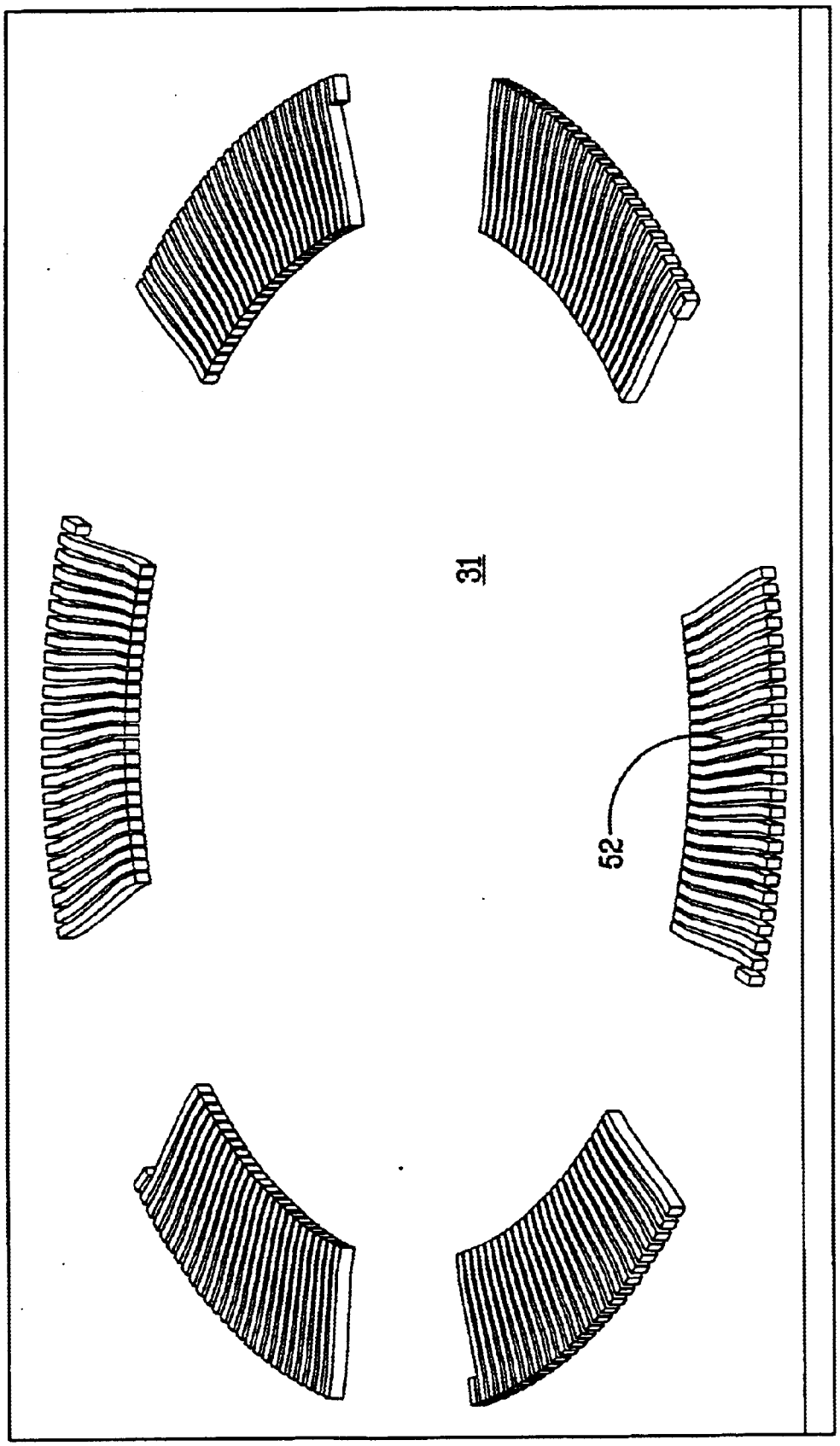
FIG. 6 shows a top perspective view of a stator coil bottom layer formed by a first LIGA step to build up the structure of the rotatable wedge prism assembly of FIG. 5.

FIG. 6 shows a set of six coil bottoms 52 for a six-pole stator as formed on the substrate 31. The substrate 31 can be a flat, precision substrate of a structural material that can withstand the process temperatures (<500° C.). Furthermore, the substrate 31 can be an optically transparent material, such as glass, silicon, or ceramic composite, to allow the light beam to pass through the annulus 32 of the rotary microactuator 30 that defines the optical aperture of the integral wedge prism 1. Alternatively, the substrate 31 can have a shaped opening (not shown) therethrough to provide the optical aperture. The substrate 31 can be blanket coated with a thin, electrically conducting precursor layer (e.g., 500 angstroms of copper) to facilitate subsequent build-up of the stator coil bottoms 52 and bond pads 57 by electroplating.

In FIG. 6, the stator coil bottoms 52 are fabricated by patterning an electrically conductive layer, such as copper, on the substrate 31. For a 25-turn stator coil 51, the copper coils can have a square cross-section of about 25 microns on a side. The substrate 31 can be initially coated with a thick photoresist (not shown), such as polymethylmethacrylate (PMMA). The photoresist can be lithographically exposed through a patterning mask to produce a latent image of the stator coil bottoms in the photoresist. Standard UV lithography can be used to pattern the first layer, since the stator coil bottoms 52 can be only about 25 microns thick. The photoresist is developed to remove the exposed photoresist corresponding to the latent image and thereby produce a mold, into which the coil material (e.g., copper) can be electroplated. The upper surface of the electroplated coil bottoms can be planarized, by precision diamond lapping, to achieve the substrate parallelism necessary to maintain actuator tolerances and the surface planarity necessary for subsequent good diffusion bonding of the stator coil columns 53 to the stator coil bottoms 52. The mold photoresist is then removed to yield a set of six-pole stator coil bottoms 52 on the substrate 31, as shown in FIG. 6.

Figure 7:
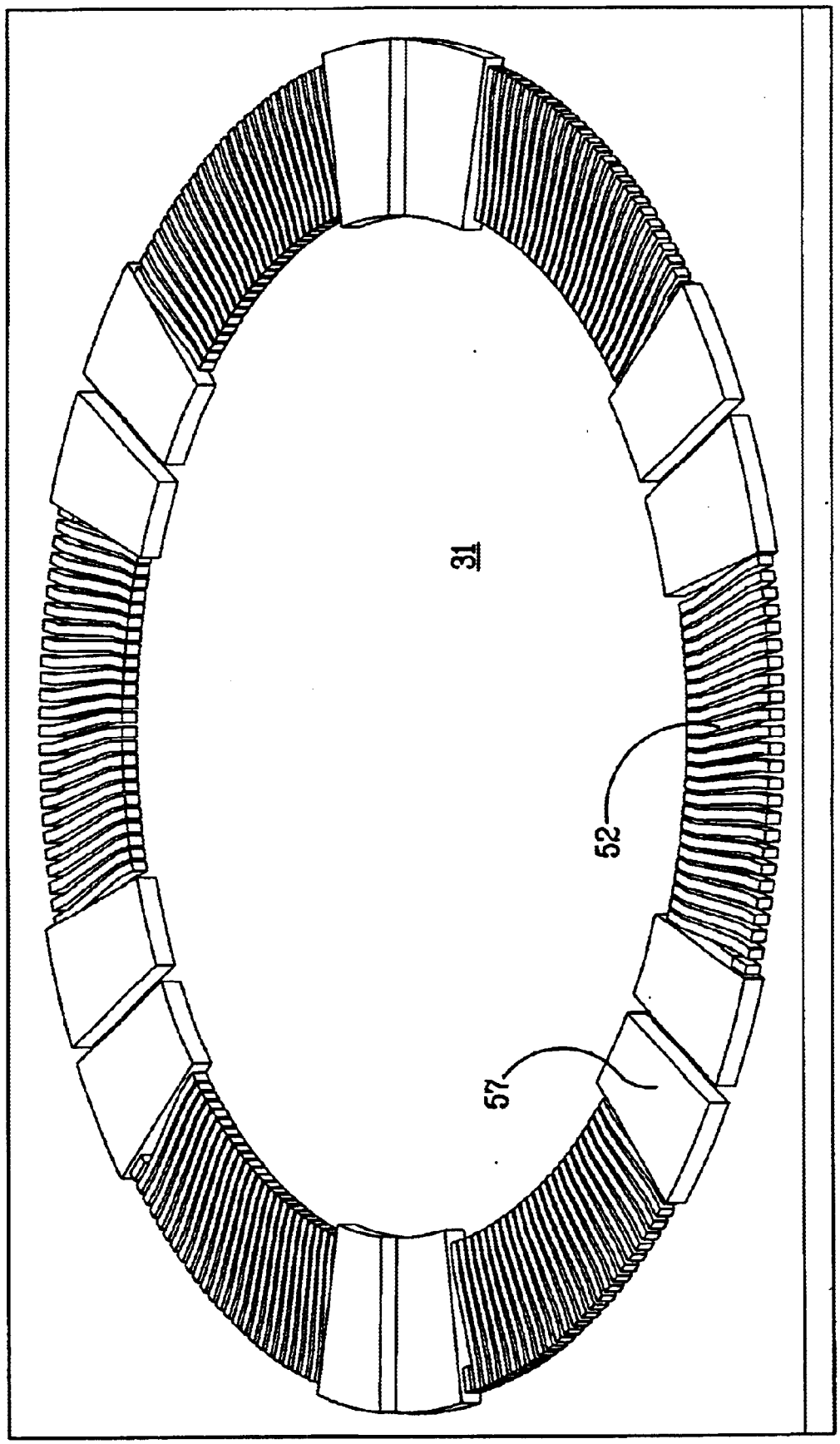
FIG. 7 shows a top perspective view of a bond pad layer formed by a second LIGA step to build up the structure of the rotatable wedge prism assembly of FIG. 5.

In FIG. 7, a second layer for building up the structure of the rotary microactuator 30 defines a plurality of bond pads 57 at each end of the stator coil bottoms 52. In addition to providing bonding sights for each stator core suspension 55 (see FIG. 8), the bond pads 57 provide attachment sites for the rotor bond extensions 44 (see FIG. 11). FIG. 7 shows the twelve paired bond pads 57 for the six stator core suspensions 55, for the six-pole stator 50, formed on the substrate 31. The bond pads 57 can be of the same material (e.g., PERMALLOY) as the stator core suspensions 55. Since the bond pads 57 provide risers for the core suspensions 55, the bond pad layer should preferably have a thickness sufficient (e.g., 40 microns) to provide electrical isolation of about 15 microns of the stator core suspensions 55 from the stator coil bottoms 52. The bond pads 57 can be formed on the substrate 31 by a LIGA process, as described above. The bond pad material can be electroplated through the developed openings in a patterned photoresist layer (not shown). After deposition of the bond pad material, the bond pads 57 can be planarized for subsequent bonding of the stator coil columns 53 and the rotor bond extensions 44 to the bond pads 57. After planarization, the photoresist layer can be removed. The precursor layer can then be selectively removed by etching to avoid inter-coil electrical shorting of the stator coils 51 and shorting of the stator to coils 51 to the stator cores 55 and rotor 41.

Subsequent coil and core layers can be built up from the stator coil bottoms 52 and bond pads 57 by conventional multi-layer processes, such as additive deposition or electroplating processes, or by diffusion bonding of separately fabricated subassemblies or subassembly arrays. A wafer-scale micromachine assembly method using diffusion bonding is disclosed, for example, in U.S. patent application Ser. No. 09/761,359 to Christenson, which is incorporated herein by reference. The assembly method disclosed by Christenson has been shown to produce integrated multi-layer micromachines by aligned layer-to-layer diffusion bonding of micromachine subassemblies at temperatures that are substantially less than one-half the melting temperature of the bonded materials. The method of Christenson which is applicable to the present invention comprises forming a first micromachine subassembly having a planar mating surface on a foundation substrate (e.g., by a LIGA process); forming a second micromachine subassembly having a planar mating surface on a substrate having a sacrificial surface release layer (i.e., a sacrificial substrate); aligning the foundation and sacrificial substrates with the mating surfaces of the micromachine subassemblies facing; diffusion bonding the mating surfaces together; and releasing the sacrificial substrate, thereby exposing the released surface of the second micromachine subassembly. The planarized mating surfaces are typically prepared immediately prior to bonding by a plasma cleaning and ammonium hydroxide treatment, in the case of nickel for example, to remove the surface oxide. This layer-to-layer method can be repeated as many times a needed to build up the structure of the multi-layer micromachine. Precision alignment tolerances of below one micron have been achieved with this method. The excellent bond strength and electrical conductivity resulting from the low-temperature bonding process is due to the high purity and small grain size of the electroplated material and the high flatness and low surface roughness (i.e., better than 1 microinch) achieved by modern planarization techniques, such as precision diamond lapping. Thus, the low-temperature diffusion bonding method can enable batch assembly of an array of rotary microactuators 30 with submicron intercomponent tolerances.

Figure 8:
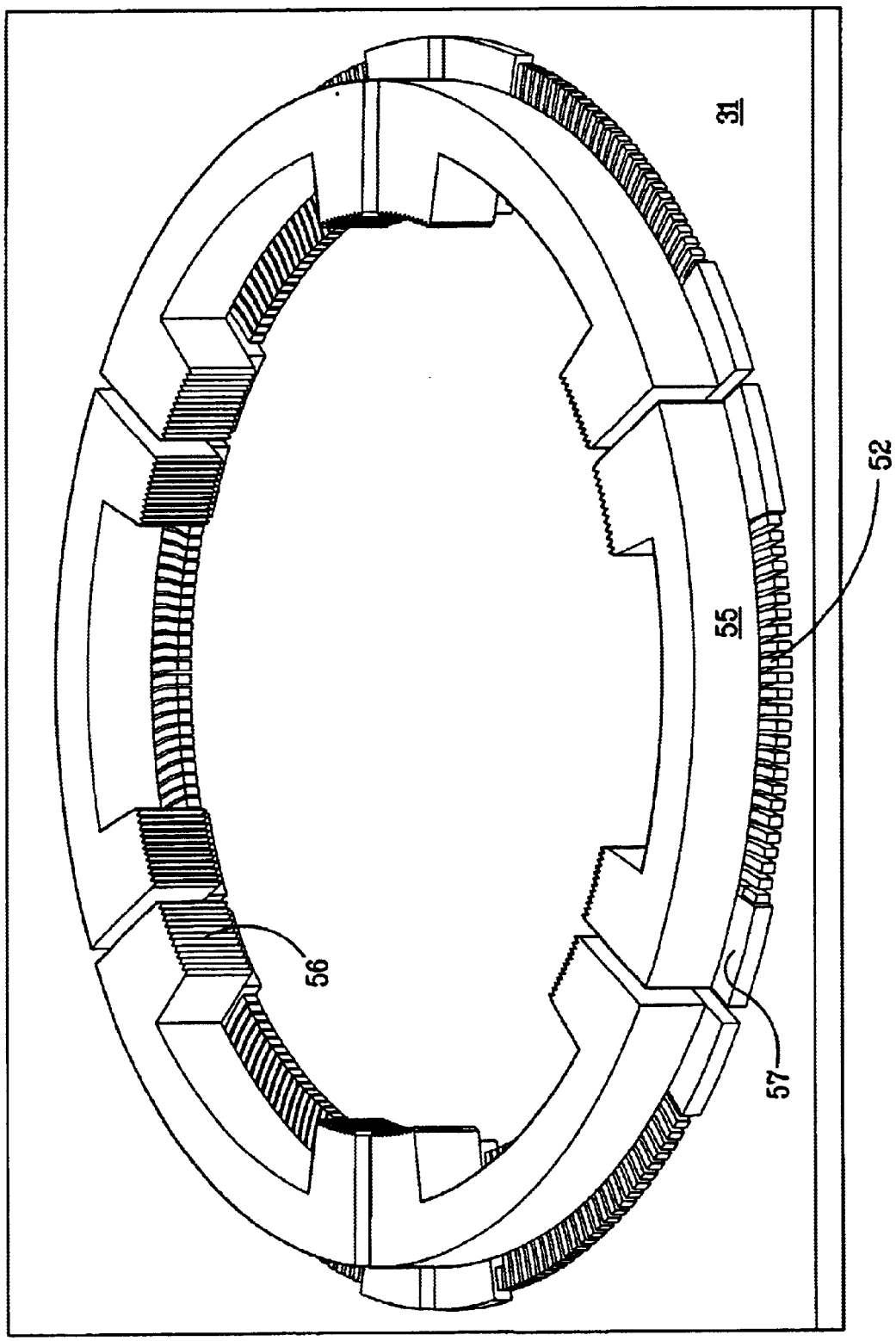
FIG. 8 shows a top perspective view of a stator core suspension layer formed by a third LIGA step to build up the structure of the rotatable wedge prism assembly of FIG. 5.

In FIG. 8, a third layer is used to build up a plurality of stator core suspensions 55 attached to the paired bond pads 57 and suspended above the stator coil bottoms 52. As described above, the stator core suspensions 55 and bond pads 57 can be a soft (high permeability) ferromagnetic material, such as electroplated PERMALLOY (78/22 Ni—Fe) or an electroplated nickel-iron-cobalt alloy. The stator core suspensions 55 can have a cross-section of about 250 microns on a side. The stator core suspensions 55 can be patterned to form magnetically salient, variable-reluctance pole faces 56. The stator pole face geometry can further comprise axial square teeth with a tooth pitch, for example, of about 10 microns.

In FIG. 8, the core suspensions 55 can be formed on a core sacrificial substrate (not shown) and diffusion bonded to the bond pads 57 of FIG. 7 according to the layer-to-layer method describe above. The core sacrificial substrate can be a precision substrate (e.g., silicon or alumina) having an electrically conductive sacrificial surface release layer, such as 0.5–1 micron thickness of titanium. The core suspensions 55 are formed by coating the core sacrificial substrate with a photoresist, lithographically exposing the photoresist (e.g., PMMA) through a patterning mask, developing of the photoresist to form a mold, and electroplating of the core material into the photoresist mold. DXRL is preferred for patterning of the photoresist to form the stator core suspensions 55 because of the greater thickness (e.g., 250 microns) of the stator core suspensions 55 and the precise tolerances desirable for the stator-rotor working gap and the stator pole face geometry. The exposed mating surface of the stator core suspensions 55 is then planarized, for subsequent bonding of the stator core suspensions 55 to the bond pads 57, and the photoresist is removed to yield the stator core suspensions 55 on the core sacrificial substrate.

The substrate 31 and core sacrificial substrate can be inverted and aligned with the aid of precision gauge pins press fit into one of the substrates with the opposing substrate having complimentary matching holes. The substrates can then be press-fit together, and the stator core suspensions 55 can be diffusion bonded to the bond pads 57. For Ni and Ni—Fe cores, the diffusion bonding can be done at about 475° C. and 5000 psi for 1 hour in a vacuum hot press. The core sacrificial substrate can then be released from the stator core suspensions 55 by removing the release layer (e.g., titanium) with a suitable etchant (e.g., hydrofluoric acid and/or hydrogen peroxide) to yield an array of stator core suspensions 55 bonded to the bond pads 57 on the substrate 31 as shown in FIG. 8.

Figure 9:
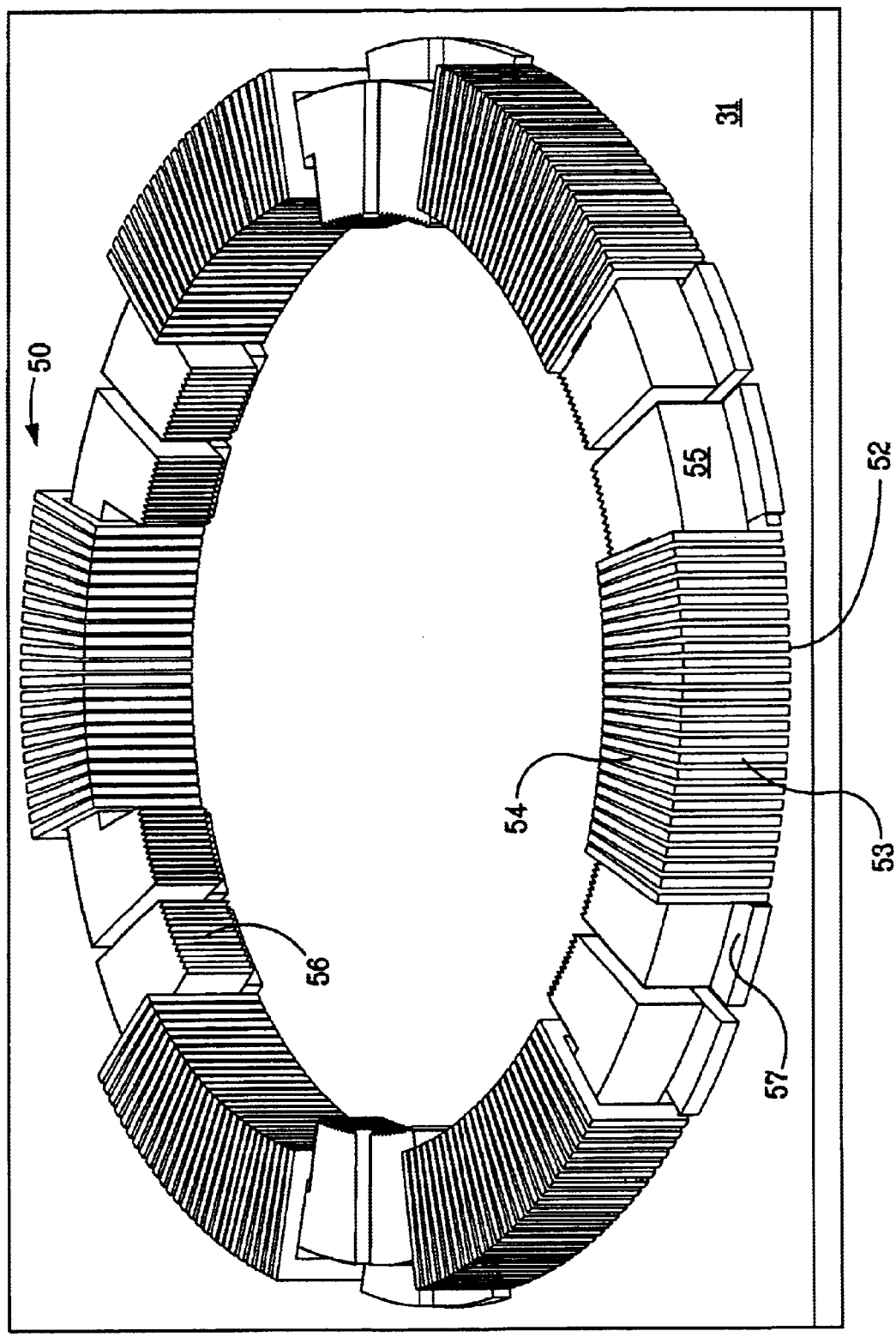
FIG. 9 shows a side perspective view of a six-pole, three-phase stator assembly formed by fourth and fifth LIGA steps to build up the structure of the rotatable wedge prism assembly shown in FIG. 5.

In FIG. 9, a fourth layer used to build up the structure of the rotatable wedge prism assembly comprises a plurality of stator coil columns 53. The stator coil columns 53 can have a height of 280 microns to provide an electrical isolation of 15 microns of the stator coil tops 54 from the stator core suspensions 55. The stator coil columns material can be the same material as that used for the stator coil bottoms 52 (e.g., electroplated copper). The stator coil columns 53 can be formed on a coil columns sacrificial substrate (not shown) and then diffusion bonded to the stator coil bottoms 52 by a layer-to-layer method as described above. Prior to bonding, the stator coil columns 53 are planarized, the mating surfaces are prepared as described previously, and the coil columns sacrificial substrate is aligned to the substrate 31 using gauge pins. Because of the relatively large height of the stator coil columns 53 (e.g., 280 microns) and the need for precise definition of the inter-coil spacings, DXRL is preferred for patterning of the stator coil columns 53. For copper stator coils 51, the stator coil columns 53 can be diffusion bonded to the stator coil bottoms 52 at about 400° C. and 5000 psi for one hour in a vacuum hot press. The coil columns sacrificial substrate can then be released from the stator coil columns layer, yielding an array of stator coil columns 53 bonded to the stator coil bottoms 52 on the substrate 31.

The stator assembly 50, shown in FIG. 9, is completed by bonding a fifth layer, comprising the tops 54 of the stator coils 51, onto the stator coil columns 53. The stator coil tops 54 are formed on a stator coil tops sacrificial substrate (not shown) by a LIGA process, as described previously. The mating surfaces are planarized and prepared, the coil tops sacrificial substrate is inverted and aligned to the substrate 31, the stator coil tops 54 are diffusion bonded to the stator coil columns 53, and the coil tops sacrificial substrate is released from the stator coil tops 54 to yield the completed stator assembly 50 on the substrate 31, as shown in FIG. 9.

Figure 11:
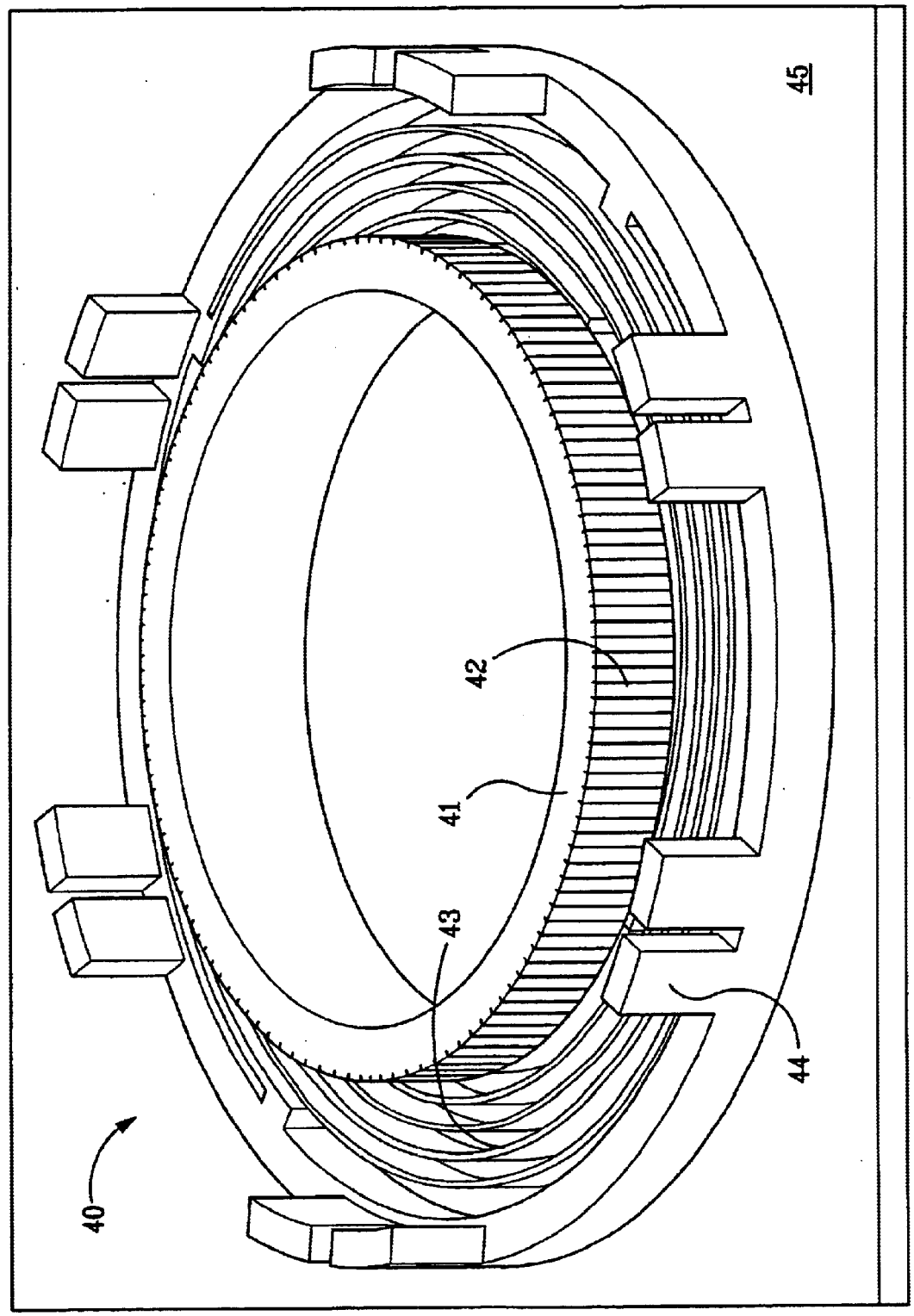
FIG. 11 shows a bottom perspective view of a rotor assembly formed by a seventh LIGA step to build up the structure of the rotatable wedge prism assembly shown in FIG. 5.

The rotor assembly 40, shown in FIG. 11, can be fabricated by two-layer LIGA process on a spring sacrificial substrate 45. The rotor assembly 40 comprises a soft ferromagnetic annular rotor 41 that is rotatably attached to a plurality of interleaved rotor torsional springs 43 that are in turn attached to rotor bond extensions 44 which can be diffusion bonded to the bond pads 57 on the substrate 31. The rotor torsional springs 43 allow for rotation of the rotor 41 within the stator assembly 50.

Figure 10:
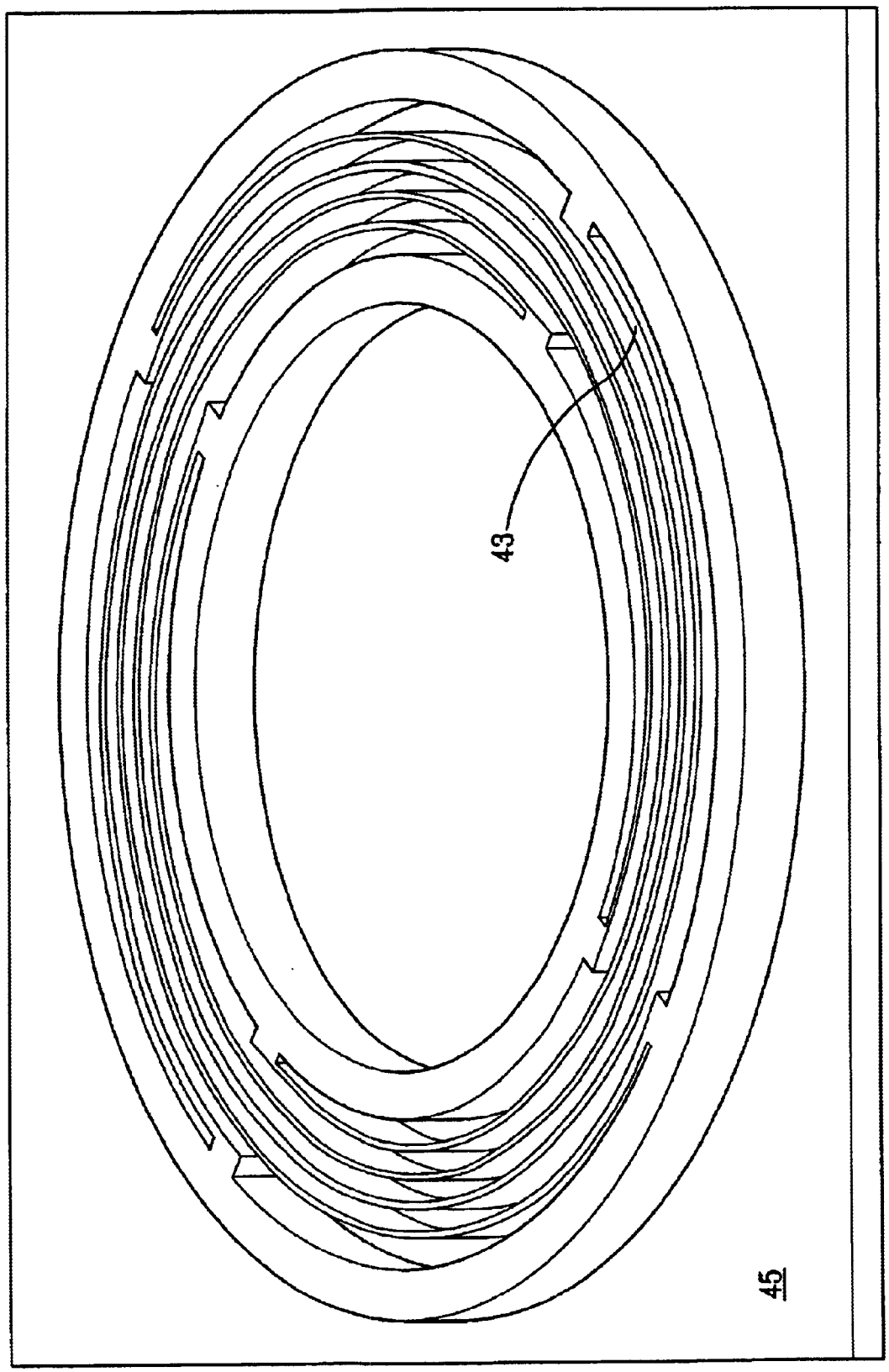
FIG. 10 shows a bottom perspective view of a rotor torsional spring layer formed by a sixth LIGA step to build up the structure of the rotatable wedge prism assembly shown in FIG. 5.

The rotor torsional springs 43 are shown in greater detail in FIG. 10. For this example of the rotary microactuator 30 of the present invention, the spring constant about the rotational axis can be about 2 Newtons per meter (N/m) to enable the rotor 41 to rotate through +/−180°. The spring material preferably has a yield strength near 1 Gigapascal (Gpa) and can be electroplated Ni/Fe, Ni/P, or Ni/Co. Each rotor torsional spring 43 can have a spring flexural element with a rectangular cross section having a height (e.g., 250 microns) much greater than its width (e.g., 20 microns). The high aspect ratio of the flexural element enables azimuthal rotation of the rotor 41 within the stator assembly 50, yet has sufficient stiffness in the axial direction to inhibit axial misalignment of the rotor 41 and stator 50 during prism 1 rotation. Additionally, the variable reluctance forces of the magnetic field acts to stiffen the spring response in the axial direction and thereby maintain rotor and stator axial alignment. The rotor torsional spring 43 can be formed on the spring sacrificial substrate 45 by the LIGA process previously described. DXRL patterning of a PMMA photoresist can be used to obtain a high aspect ratio of the rotor torsional springs 43.

Referring to FIG. 11, the soft ferromagnetic annular rotor 41 and rotor bond extensions 44 can be formed on a rotor sacrificial substrate (not shown) by a LIGA process. The rotor material can be a soft ferromagnetic material, such as electroplated PERMALLOY. The rotor cross-section can have a width of 115 microns. Because the height of the rotor pole face 42 can preferably match that of the stator pole face 56 (i.e., 250 microns), DXRL can be used to pattern the photoresist used to form the rotor 41. The rotor 41 is further patterned with a magnetically salient, variable-reluctance pole face 42 suitable for small angle stepping. The rotor pole face 42 can comprise axial teeth that compliment the stator pole face geometry. Stepping in increments of 0.25° can be achieved for the three-phase stator, as shown in FIG. 9, using a rotor tooth pitch of 10 microns. After the mating surfaces of the rotor 41, rotor bond extensions 44, and rotor torsional springs 43 are planarized and prepared, as described previously, and the rotor and spring sacrificial substrates aligned, the rotor 41 and rotor bond extensions 44 can be diffusion bonded to the rotor torsional springs 43. The rotor sacrificial substrate can then be released, yielding the rotor assembly 40 on the spring sacrificial substrate 45, as shown in FIG. 11.

Figure 12:
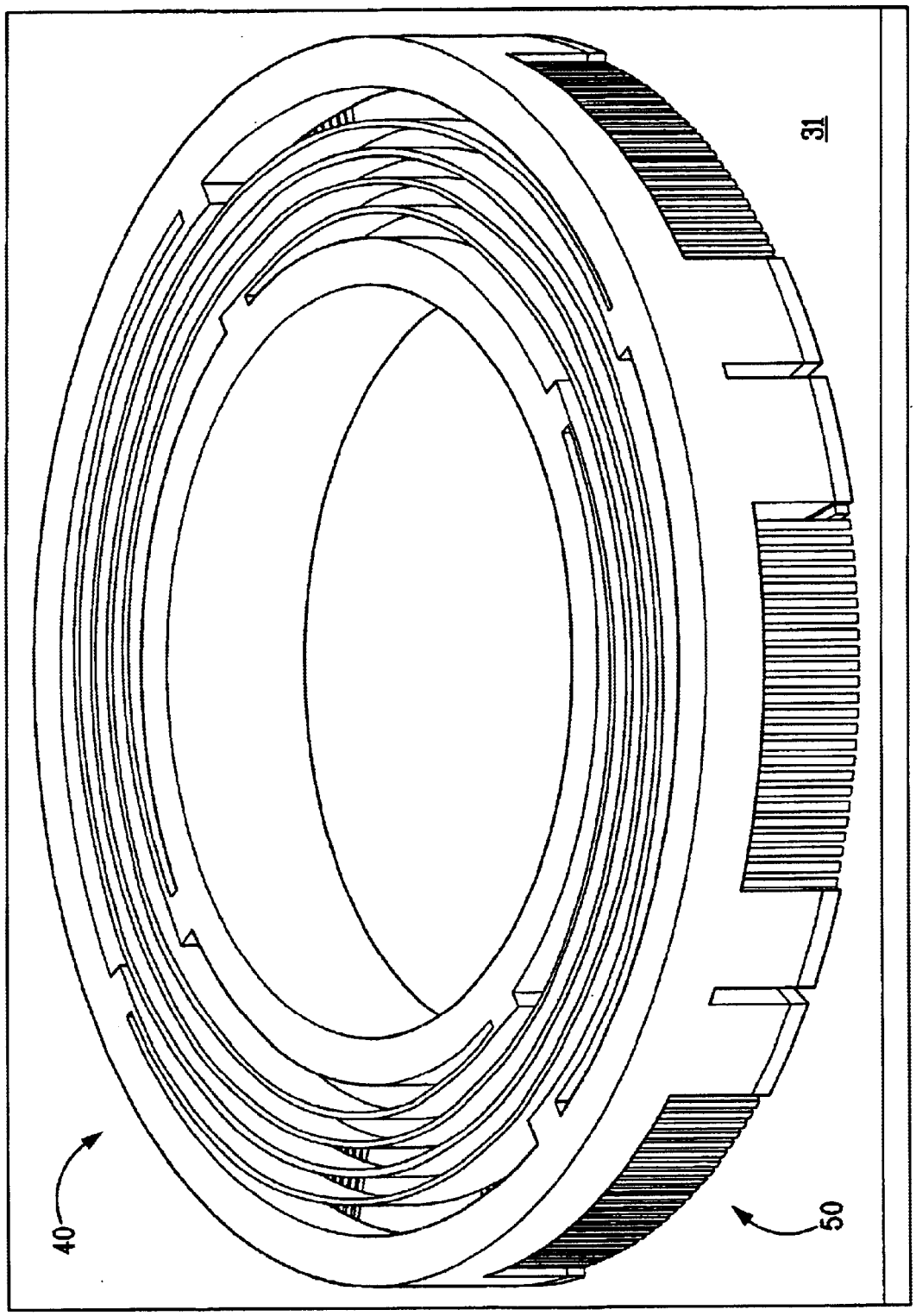
FIG. 12 shows a top perspective view of the rotary microactuator shown in FIG. 5.

Finally, the completed rotor assembly 40 can be diffusion bonded to the stator assembly 50, as shown in FIG. 12. The mating surfaces of the rotor bond extension 44 and the corresponding bond pads 57 are prepared and the spring sacrificial substrate 45 is aligned to the substrate 31. After diffusion bonding of the rotor bond extensions 44 to the bond pads 57, the rotor spring sacrificial substrate is released to yield the completed rotary microactuator 30 on the substrate 31. Because of the alignment accuracy enabled by DXRL and multi-layer diffusion bonding fabrication, the stator-rotor working gap can be about 5 microns or less. As discussed above, an array of such rotary microactuators 30 can be batch fabricated on the substrate 31.

The stepping rotary microactuator 30 is energized by connecting the stator coils 51 to a three-phase power supply (not shown). The required drive electronics can be standard three-phase variable reluctance or brushless DC type circuitry, as is known in the art. Rotor rotation is produced by sequential phased excitations of the stator coils 51. Stator poles belonging to one-phase are located opposite each other to drive the rotor 41 symmetrically. With a stator coil winding excitation at 0.5 volts and 5 milliamperes, a working magnetic gap flux density of 3000 gauss and a tangential rotor force per phase of about 5 mN can be generated with the rotary microactuator 30 of the present invention.

An even higher drive torque and greater efficiency are possible with a hybrid stepping actuator having a permanent magnet in the rotor 41 or stator 55. This can be done by a DXRL process as described in copending U.S. patent application Ser. No. 09/452,321 to Christenson, which is incorporated herein by reference.

An alternative to a magnetic drive is to use an electrostatic stepping microactuator and drive the microactuator electrostatically with a high voltage. An example of an electrostatic stepping microactuator fabricated by LIGA processes is disclosed by *Wallrabe*, et al., "Design rules and test of electrostatic micromotors made by the LIGA process" in J. Micromech. Microeng. 4 (1994). Because the variable-reluctance stepping rotary microactuator 30 of the present invention can be formed using electromagnetic stator coils to drive the rotor 41 rather than electrostatic forces, much lower voltages can be used as compared to typical electrostatic microactuators. A drive voltage of 200 volts or more may be required for an equivalent electrostatic drive with a 5 micron rotor-stator gap.

Fabrication of the Integral Wedge Prism

An integral wedge prism 1 of a Risley prism pair can fabricated in situ within the rotary microactuator 30 to complete the fabrication of a rotatable wedge prism assembly, as shown in FIG. 5. The wedge prism 1 can be fabricated by lithographically patterning the optical surface of the wedge prism 1 in a photoresist, as disclosed in copending U.S. patent application Ser. No. 09/742,778 to Sweatt and Christenson, which is incorporated herein by reference. Formation of the wedge prism 1 comprises coating a substrate with a photoresist (e.g., PMMA); positioning a patterning mask above the photoresist; exposing the photoresist to a collimated beam of radiation through the mask to code a latent profile defining the optical surface in the photoresist; and developing the photoresist to produce the wedge prism 1 on the substrate. With DXRL, wedge prisms 1 having structural heights in excess of one millimeter, RMS optical surface smoothness better than 10 nanometers, and dimensional tolerances of less than 0.1 micron can be produced.

Figure 13:
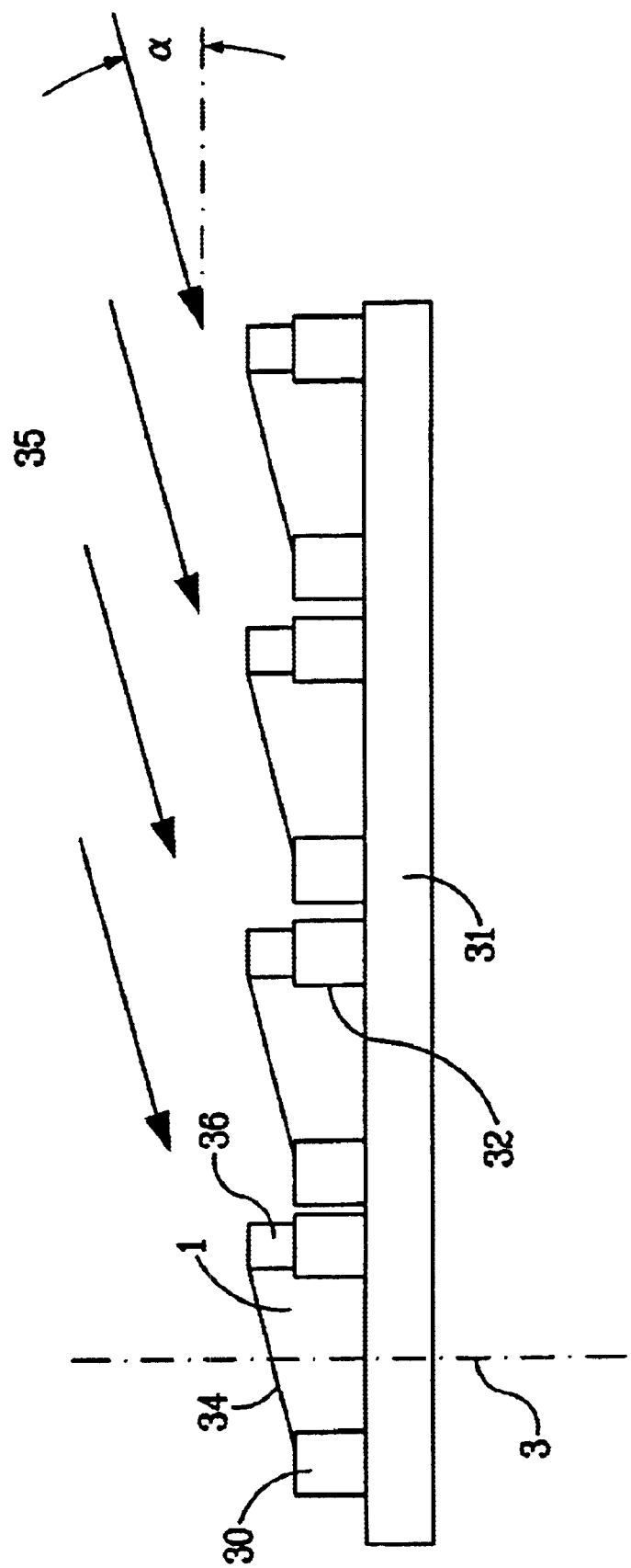
FIG. 13 illustrates a lithographic exposure geometry to fabricate a wedge prism integral to the annular rotor within a rotary microactuator using DXRL.
Figure 14:
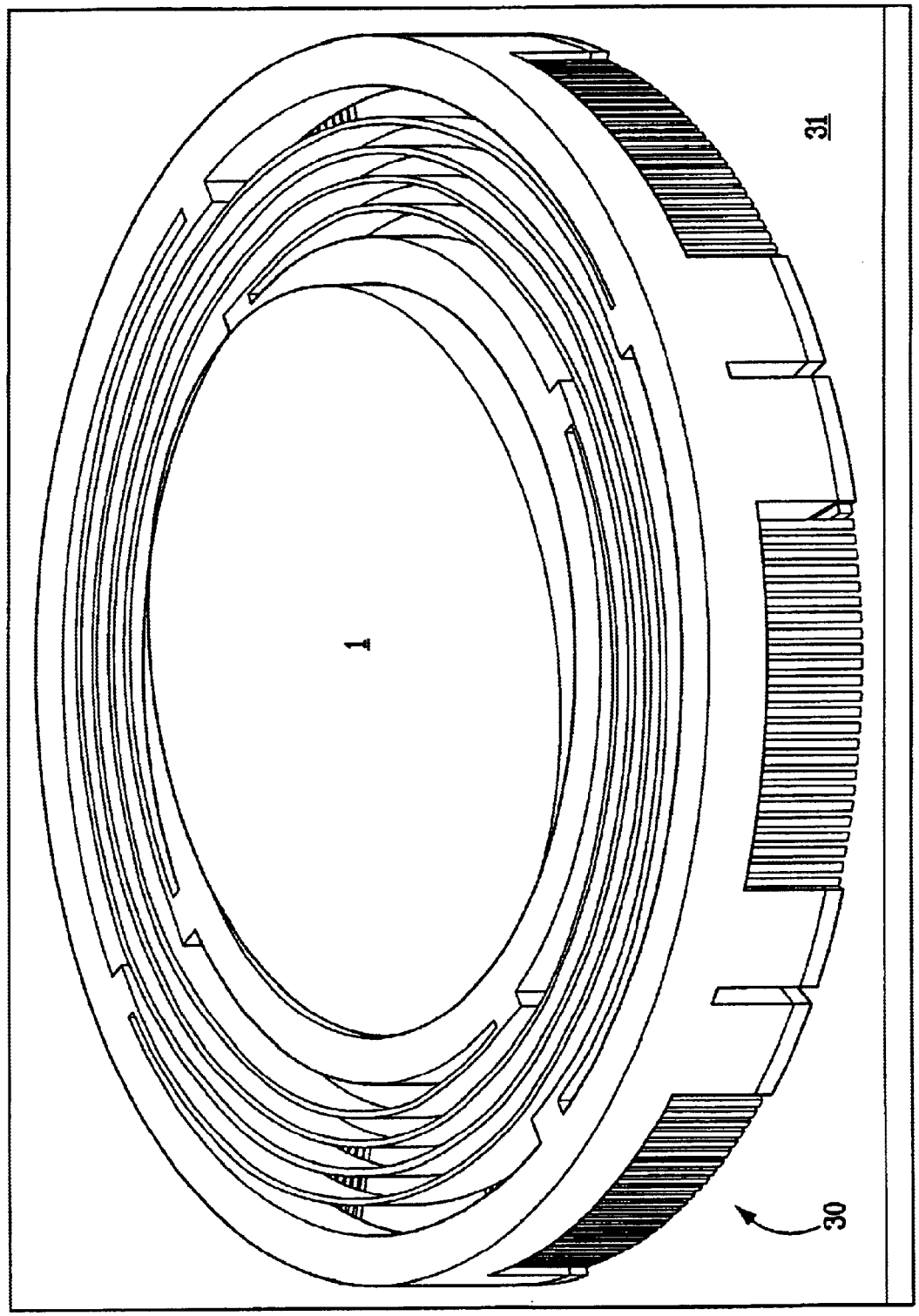
FIG. 14 shows a perspective view of the completed rotatable wedge prism assembly of FIG. 5.

FIG. 13 shows an example of a particular exposure geometry whereby a wedge prism 1 can be fabricated by DXRL integral to the rotor 41 within the rotary microactuator 30. If a transparent substrate 31 is used, the rotor annulus 32 (i.e., the inner diameter of the rotor 41) can be filled with a photoresist prism material. The photoresist prism material can be an injection-molded polymer or an in-situ polymerized casting resin, such as PMMA. Alternatively, the substrate 31 can have circular openings (not shown) to define the optical apertures therethrough and the openings can be plugged prior to formation of the wedge prism 1. The angled optical surface 34 of the wedge prism 1 can be produced by DXRL. This can be done by exposing the photoresist prism material at the prism apex angle, $\alpha$, to a collimated beam of high-energy x-rays 35 through a patterning mask 36. If desired, second masked exposure (not shown) can then be made parallel to the optical axis to better define the outer circumference of the wedge prism 1. The exposed photoresist is then removed by a suitable developer. As shown in FIG. 13, this process yields a rotatable wedge prism assembly comprising a wedge prism 1 mounted with the rotor 41 of the rotary microactuator 30. As indicated in FIG. 13, an array of wedge prisms 1 can be batch fabricated by the DXRL process using an appropriate patterning mask 36.

Alternatively, one or more wedge prisms 1 can be separately fabricated by DXRL, or other process for fabricating micro-optical elements, and subsequently inserted into the rotor annulus 32 and affixed thereto. Alternative embodiments of the present invention can produce prisms 1 comprising other optical materials, such as glass. As disclosed in the copending U.S. patent application Ser. No. 09/742,778 to Sweatt and Christenson, a metal mold for forming the prism array can be produced by LIGA. Glass, or other suitable optical material, can be introduced into the mold by melting, sol-gel processing, or other suitable method. The exposed surface of the molded optical material can be polished to form the angled optical surface 34, the wedge prism 1 aligned and bonded to the annular rotor 41, and the mold removed. Again, arrays of such wedge prisms 1 can be fabricated by suitable batch processing methods.

Assembly of the Optical Switch

The optical switch 10, as shown in the example of FIG. 3, can be used to switch light beams from a plurality of input ports to a plurality of output ports. The optical switch 10 comprises an array of input Risley prism pairs 11 for redirecting the light beams 5 from the plurality of input ports to an array of output Risley prism pairs 21 that similarly direct the switched light beams 6 to the plurality of output ports. The arrays of input and output Risley prism pairs 11, 21 each comprise an array of first wedge prisms 1 paired with an array of associated second wedge prisms 2, as shown schematically in FIG. 3. The first and second wedge prism arrays can be fabricated on separate substrates 31, according to the LIGA and DXRL processes described above, with reference to FIGS. 5–13.

The input port can comprise a collimating lens array 13, or other means known to those in the art, for collimating the incident light beams 4 from a plurality of input optical fibers 12 into the array of input Risley prism pairs 11. Similarly, the output port can comprise a focussing lens array 23, or other means known to those in the art, for focussing the switched light beams 6 from the output Risley prism pairs 21 into an array of output optical fibers 22. The input and output ports can be fabricated according to methods known to those in the art. The entire optical switch 10 of FIG. 3 can be enclosed within a hermetic package or other container with fiber optic connectors at each end for attaching the optical fibers 12, 22.

It will be understood that the above description is merely illustrative of the applications of the principles of the present invention, the scope of which is to be determined by the claims viewed in light of the specification. Other variants and modifications of the invention will be apparent to those of skill in the art.

We claim:

1. A stepping rotary microactuator, comprising:
   a substrate;
   a cylindrically symmetric stator assembly on the substrate, comprising a plurality of nonplanar stator coil windings surrounding a plurality of stator cores, with each stator core further comprising a magnetically salient, variable-reluctance pole face; and
   an annular rotor of soft ferromagnetic material mounted within the stator assembly, with the rotor further comprising a magnetically salient, variable-reluctance pole face.

2. The stepping rotary microactuator of claim 1, further comprising means for phased electrical excitation of the stator coil windings to rotate the rotor within the stator assembly.

3. The stepping rotary microactuator of claim 1, wherein the stator assembly comprises a six-pole, three-phase stator with the plurality of stator coil windings comprising six stator coil windings and the plurality of stator cores comprising six stator cores.

4. The stepping rotary microactuator of claim 1, wherein each stator core and the rotor has a pole face with a vertical height of one millimeter or less.

5. The stepping rotary microactuator of claim 1, wherein the pole face of each stator core and the rotor comprises axially oriented teeth with a tooth pitch of 10 microns or less.

6. The stepping rotary microactuator of claim 1, wherein each stator core comprises a soft ferromagnetic material further comprising an electroplated alloy selected from the group of metals consisting of nickel, iron, cobalt, and combinations thereof.

7. The stepping rotary microactuator of claim 1, wherein the rotor comprises a soft ferromagnetic material further comprising an electroplated alloy selected from the group of metals consisting of nickel, iron, cobalt, and combinations thereof.

8. The stepping rotary microactuator of claim 1, wherein the rotor is mounted within the stator assembly by at least one torsional spring flexurally connected between the rotor and stator assembly.

9. The stepping rotary microactuator of claim 8, wherein the torsional spring comprises an electroplated alloy further comprising nickel.

* * * * *